United States Patent Office 2,876,133
Patented Mar. 3, 1959

2,876,133

PROCESS FOR PREPARING ORGANOPHILIC PARTICULATE SOLIDS BY POLYMERIZING ETHYLENICALLY UNSATURATED MONOMERS UPON THE SURFACE OF ORGANOPHOBIC PARTICULATE SOLIDS

Ralph K. Iler and Robert D. Lipscomb, Wilmington, Del., assignors to E. I. du Pont de Nemours and Company, Wilmington, Del., a corporation of Delaware No Drawing. Application November 15, 1954
Serial No. 468,995

22 Claims. (Cl. 117—54)

This invention relates to a novel process for preparing a new type of modified particulate solids. More particularly this invention relates to a new process for preparing organophilic particulate solids.

Many important commercial products depend in large part for their utility on the properties arising from dispersions of inorganic particulate solids, i. e., solids relatively small in all dimensions, in organic systems, e. g., fillers, such as wood flour, carbon black, titania, and the like, in organic plastics and rubbers; pigments and metal powders in paints and fabric coating composiitons, and the like. In all such systems, it would obviously be desirable if the various inorganic particulate solids were more compatible with the organic components, i. e., were organophilic at least on the surfaces, thereby leading to stronger and more uniform products. Such organophilic solids would also obviate the difficulties in presently known systems due to the organophobic nature of the particulate solids, i. e., settling out and resultant non-uniformity of the system and in some cases even degradation and decomposition of the organic system. Many attempts have been made over the years to prepare organophilic particulate solids without modifying the desirable properties thereof but no general method has been achieved.

Recently, organophilic silicas have been prepared by the partial surface esterification of silica in the requisite form with selected alcohols as disclosed in Iler, U. S. Patent 2,657,149. Organophilic silicas and titanias also have been prepared by contacting a freshly fractured silica or titania having active surfaces with selected polymerizable ethylenically unsaturated monomers as disclosed respectively in the copending application of Arnett, Bechtold and Benson Serial No. 268,354, filed January 25, 1952, now U. S. Patent 2,728,732, issued December 27, 1955, and the copending application of Benson Serial No. 287,047, filed May 9, 1952, now U. S. Patent 2,749,248, issued June 5, 1956. However, these processes are specific to silica and titania and are not of general applicability for the preparation of organophilic particulate solids.

It is an object of this invention to provide a novel process for preparing a new type of modified particulate solid. A further object is to provide a novel process for preparing organophilic particulate solids. A still further object is to provide a novel process of general applicability for the preparation of organophilic particulate solids. Other objects will appear hereinafter.

These objects are accomplished by the following invention of a process for preparing organophilic particulate solids which comprises passing vapors of at least one addition-polymerizable ethylenically unsaturated monomer into contact with degassed particulate solids coated with a free radical generating, addition-polymerization initiator, polymerizing the vaporized ethylenically unsaturated monomer on the surfaces of said degassed initiator-coated particulate solids, and obtaining as the resulting product organophilic polymer-coated particulate solids. The process of this invention can be carried out by coating particulate solids with a free radical generating, addition-polymerization initiator, degassing the initiator-coated particulate solids, then passing vapors of at least one addition-polymerizable ethylenically unsaturated monomer into contact with said degassed initiator-coated particulate solids and polymerizing the vaporized ethylenically unsaturated monomer on the surfaces of said initiator-coated particulate solids, and obtaining as the resulting product organophilic polymer-coated particulate solids. However, depending on the nature of the initiator, the coating and degassing may be done in reverse order; thus when the initiator is coated on the particulate solids in the vapor phase, the degassing will precede the coating step.

There has now been discovered a new process of general applicability for the preparation of organophilic particulate solids which comprises coating the particulate solids with a free radical generating, addition-polymerization initiator, degassing the initiator-coated particulate solids, and, after degassing, exposing the thus activated particulate solids to the vapors of an addition-polymerizable, ethylenically unsaturated monomer or monomers causing polymerization thereof upon the initiator-coated activated surfaces of the particulate solids. The polymerization of the monomer vapors upon the initiator-coated surfaces of the particulate solids occurs under substantially oxygen-free and anhydrous conditions as the degassing removes oxygen and water from the particulate solids and the monomer vapors are air-free.

Coating of the particulate solids with the addition-polymerization initiator can be carried out in any fashion by any treatment which causes the initiator to be carried on or absorbed by the surfaces of the particulate solids, and includes simple mixing, vapor-phase deposition, or solution deposition, including both aqueous and anhydrous solutions. One or more of any of the recognized classes of free radical generating, addition-polymerization initiators can be used, including the peroxy and azo types, as well as the multi-component redox systems.

Any one or more of the well recognized classes of ethylenically unsaturated addition-polymerizable monomers can be used, including those containing one or more than one ethylenically unsaturated linkage per molecule. The conditions of time and temperature required for the polymerization step will obviously vary within the ranges known in the art depending upon the particular monomer system involved, the particular addition-polymerization initiator being used, and obviously the amount of polymer to be deposited on the surfaces of the particulate solids. Generally speaking, conventional temperatures will range from —50° to about 250° C. with reaction times ranging from 15 minutes to about 120 hours. Longer times can be used, of course, but substantially no practical advantages arise therefrom.

It is essential that the monomer vapor be in intimate contact with the surfaces of the particulate solids being modified. Thus, before exposure to the monomer vapor, and after activating the surfaces of the particulate solids by coating with the addition-polymerization initiator in the case of solution coating and before, in the case of vapor coating, the activated particulate solids should be thoroughly degassed to remove materials inhibitory of polymerization, e. g., oxygen, or those which would prevent contact of the monomer vapor with the surface of the particulate solids, e. g., liquid water. Usually the degassing of the initiator modified particulate solids is accomplished by evacuating the initiator modified particulate solids to mercury vapor pump pressures, e. g., $1 \times 10^{-1}$ to $1 \times 10^{-5}$ mm. of mercury, at room temperature of 20° C. or slightly elevated temperatures, e. g., up to about 50° C., and preferably holding the solid at these pressures with constant pumping for a few hours, e. g., 0.1–24 hours and usually 1 to 4 hours. In those instances where degassing is carried out first, i. e. when the initiator is coated from the vapor phase, the temperatures of degassing can range higher, e. g., around 150° C. under the same pressure and time conditions.

It is desirable that there be as much monomer vapor as possible in contact with the initiator modified particulate solids during the polymerization step. Thus, although inert gases such as nitrogen, argon, helium, and the like, can be present they result only in a dilution of the monomer vapors and slow up the polymerization by interfering with the diffusion of monomer vapor to the surfaces of the initiator-coated particulate solids where polymerization occurs. Obviously, non-inert bases, e. g., oxygen, are to be avoided since in many instances the polymerization would be completely interrupted. Accordingly, it is preferred that there be present during the polymerization step only the initiator modified particulate solids and substantially pure monomer vapor that is free of air. The activated particulate solids after degassing are thus exposed to the vapors of the addition-polymerizable ethylenically unsaturated monomer or monomers under substantially oxygen-free and anhydrous polymerization conditions.

As is illustrated by the following examples, the modified particulate solids produced by the process of this invention are generically organophilic, particulate solids exhibiting very good compatibility with organic systems. In these examples, which are submitted only as illustrative of the invention and not limitative thereof, the parts given are by weight.

Example I

A solution of 0.20 part of alpha,alpha'-azobis-(alpha, gamma-dimethylvaleronitrile) polymerization initiator in 100 parts of purified dry cyclohexane was slurried with 7.7 parts of finely divided silica (specific surface area 300 m.$^2$/g., corresponding to an average ultimate particle diameter of about 0.008 micron, i. e. 8.0 millimicrons) and the mixture allowed to stand for two hours at room temperature. The silica and absorbed initiator was removed by filtration and dried. Upon evaporation of the cyclohexane from the filtrate there was recovered only 0.01 part of residue, indicating nearly complete absorption of the polymerization initiator by the silica. The initiator-coated silica was placed in a closed reactor and thoroughly freed of cyclohexane, air, and other absorbed vapors by constant pumping at mercury vapor diffusion pump pressure for several hours at room temperature. The degassed, initiator-coated silica was then connected to a reservoir of air-freed, monomeric methyl methacrylate and the monomer allowed to vaporize and diffuse from the reservoir at room temperature over a period of three days. Upon removal of the solid from the system, there was obtained 16.8 parts of polymethyl methacrylate-coated silica as a white, freeflowing, organophilic powder containing about 53% by weight polymethyl methacrylate.

Similar tests using smaller and larger proportions of the methyl methacrylate monomer resulted in polymethyl methacrylate-coated silica powders containing from 21 to 73% of polymethyl methacrylate based on the total composition, i. e., containing from 79 to 27% silica. All the products within this range of silica and polymethyl methacrylate proportions were white free flowing solids quite similar in appearance to the original silica but exhibiting greatly improved organophilic character. Furthermore, these polymethyl methacrylate-coated silica compositions could all be hot-pressed at 180° C. and 4,000–12,000 lb./sq. in. pressure into cohesive, self-supporting films. In particular, those compositions containing less than 50% silica, i. e., having more than 50% polymethyl methacrylate based on the total composition, were clear and transparent in film form.

The hot-pressed films of these polymethyl methacrylate-coated silica compositions exhibited greatly increased surface hardness over unmodified methyl methacrylate films. Thus, a hot-pressed film of a polymethyl methacrylate-coated silica containing 73%, based on the whole, of polymethyl methacrylate was clear and transparent and the surfaces of the film could not be scratched by a 9H pencil; whereas, a similar film prepared from an unmodified sample of polymethyl methacrylate was scratched by a 3H pencil. Ordinary commercial polymethyl methacrylate sheeting exhibits a surface hardness of 6H as measured by the pencil method. As further contrast, it is to be noted that polymethyl methacrylate compositions filled with unmodified silica can be formed into cohesive films but are translucent and almost opaque even at low silica loadings.

Example II

Finely divided titanium dioxide powder was slurried with a methtylene chloride solution containing 1%, by weight of the titanium dioxide, of the addition-polymerization initiator, alpha,alpha'-azobis(alpha,gamma,gamma-trimethylvaleronitrile). The slurry was filtered and the residue vacuum-dried. The resultant dry, initiator-coated titania was then placed in a closed reactor, degassed by thorough pumping at room temperature under mercury vapor diffusion pump pressures and finally exposed at room temperature to the vapors from an air-freed sample of liquid monomeric styrene, all as described in Example I. After standing under these conditions for three days, during which time the activated titania powder was occasionally stirred, the reactor was removed from the system and the solid product isolated. There was thus obtained a free-flowing organophilic polystyrene-coated titania powder, resembling very closely the original unmodified titania but containing 19.6% polystyrene, based on the composition as a whole.

*Analysis.*—Calc'd for $(C_8H_8)_x$: C, 92.3%; H, 7.7%; C/H ratio, 12.0/1. Found (for the polystyrene-coated titania): C, 17.9%; H, 1.7%; C/H ratio, 10.5/1.

In contrast to the relatively rapid light-induced degradation of carboxamides with unmodified titania delusterants, e. g., a sample of the above unmodified, finely divided titanium dioxide powder in commercially available polyhexamethyleneadipamide, no light-induced, oxidative degradation of carboxamides whatever is caused by a sample of the above polystyrene-coated titania at the same concentrations. At the same time the polystyrene-coated titania was appreciably more organophilic than the unmodified titania and blended more readily with the carboxamide.

Example III

A solution of 0.2 part of alpha,alpha'-azobis(alpha, gamma, gamma-trimethylvaleronitrile) in 100 parts of cyclohexane was slurried with 21.8 parts of finely divided aluminum flake. The solid was removed by filtration, dried, and the resultant initiator-coated aluminum flake placed in a closed reactor, degassed by thorough pumping at room temperature under mercury vapor diffusion pump pressures, and finally exposed to the vapors from an air-freed sample of liquid methyl methacrylate monomer at room temperature, all as described in Example I. After standing for five days under these conditions, the resultant solid was removed. There was thus obtained 37 parts of a polymethyl methacrylate-coated aluminum flake as a fluffy, gray, freeflowing, organophilic powder containing 41% polymethylmethacrylate by weight of the composition.

The powdery product was easily hot-pressed to shiny, tinfoil-like, brittle films and molded into metallic-like impact bars at 190° C. under 1000 lb./sq. in. pressure. The volume resistivity of the molded composition, which it is to be noted contains 59% aluminum by weight, was $9 \times 10^{10}$ ohms. In contrast the volume resistivity of aluminum alone is $2.6 \times 10^{-6}$ ohms. Thus, the product of the present example is a reasonably efficient non-conductor or insulator in contrast to the high efficiency of unmodified aluminum as a conductor of electricity.

*Example IV*

A solution of 0.50 part of alpha,alpha'-azobis(alpha, gamma,gamma-methylvaleronitrile) in 250 parts of methylene chloride was slurried for 12 hours at room temperature with 50 parts of finely divided titanium dioxide powder. The initiator-coated titania was separated by filtration, dried, thoroughly degassed by pumping at mercury vapor diffusion pump pressures at room temperature, and finally exposed to the vapors of air-freed acrylonitrile at room temperature, all as described in detail in Example I. After standing for four days under these conditions, the acrylonitrile monomer had substantially disappeared from the reservoir and the polymer modified solid was removed. There was thus obtained 58.8 parts of polyacrylonitrile-coated titania as a white, free flowing, organophilic powder, very similar to the original unmodified titania but exhibiting improved organophilic properties.

*Analysis.*—Calc'd for $(C_3H_3N)_x$: C, 68.0%; H, 5.7%; C/H ratio, 12.0/1. Found (for the polyacrylonitrile-coated titania): C, 10.1%; H, 1.0%; C/H ratio, 10.5/1; $TiO_2$, 85.2%.

That the polyacrylonitrile-coated titania, like all the polymer coated particulate solids of this invention, is largely unchanged in character of particle size or in surface area is shown by the following data. The original untreated titania exhibited a specific surface area of 10.6 m. 2/g., which corresponds to an average particle diameter of 0.147 micron. The polyacrylonitrile-coated titania containing 15% by weight of the composition of polyacrylonitrile exhibited a specific surface area of 5.3 m. 2/g., which corresponds to an average particle diameter of 0.329 micron. Thus, substantially no change has occurred in the particle size in the sense of gross aggregation.

*Example V*

A solution of 0.55 part of alpha,alpha'-azobis(alpha,-gamma,gamma-trimethylvaleronitrile) in 250 parts of methylene chloride was slurried for two hours at room temperature with 49.5 parts of finely divided titanium dioxide and the resultant solid removed by filtration and dried. The initiator-coated white pigment was then carefully degassed by constant pumping under mercury vapor diffusion pump pressures in a closed reactor at room temperature and exposed to the vapors from a 1/1 by weight mixture of air-freed monomeric styrene and commercial monomeric divinylbenzene containing 57% active ingredient and an inhibitor and carrier. After standing for five days at room temperature, the modified solid product was removed. There was thus obtained 51.5 parts of an about 2/1 styrene/divinylbenzene copolymer-coated titania as a white, freeflowing powder similar to the unmodified titania but exhibiting improved organophilic character. The copolymer coating was crosslinked in view of the bifunctional divinylbenzene intermediate and accordingly was resistant to removal by good polymer solvents; for instance, it was not removed by boiling carbon tetrachloride.

*Analysis.*—Calc'd for $(C_8H_8)_x(C_{10}H_{10})_x$: C, 92.3%; H, 7.7%; C/H ratio, 12.5/1. Found (for the copolymer-coated titania): C, 3.6%; H, 0.4%; C/H ratio, 9.0/1.

This invention is generic to the preparation of organophilic particulate solids, i. e., organophilic solids which are relatively small in all dimensions and especially organophilic inorganic particulate solids, by the novel but relatively simple process which comprises coating the particulate solids with a free radical generating, addition-polymerization initiator in solution and degassing the initiator-coated particulate solids, or coating and degassing in reverse order when the initiator is coated on the particulate solids in the vapor phase, and subsequently exposing the initiator-coated particulate solids in degassed form to the vapors of an ethylenically unsaturated addition-polymerizable monomer so that polymerization thereof occurs on the surfaces of the particulate solids. It is essential in the process of this invention that the initiator coated particulate solids be thoroughly degassed as by constant pumping, preferably with a mercury vapor diffusion pump, to pressures of 0.1 mm. of mercury or lower before being exposed to the vapors of the addition-polymerizable ethylenically unsaturated monomer or monomers.

The invention is generic in its applicability to any particulate solid, i. e., any solid relatively small in all dimensions, regardless of shape or composition. "Particulate" as used here has its conventionally accepted meaning as defining particles as small as those approaching molecular dimensions, e. g., 10 angstroms (1 millimicron) ranging upward to those even as large as 1.0 mm. Particles ranging from about 2.5 millimicrons to about 10 microns are the most usual of which those ranging from about 5 millimicrons to about one micron are the most important. Generally speaking, from practical considerations, the process will mostly be applied to the particulate solids of commercial significance, such as the pigments, fillers, metal powders, and the like finely divided particulate solids and powders. Suitable specific examples of these, in addition to those illustrated specifically in the examples, include the well known metal oxide and salt pigments and fillers such as the various iron oxides; the alkaline earth metal oxides, hydroxides and salts, e. g., barium carbonate, barium sulfate, mixed magnesium sulfate/carbonate, magnesium carbonate, zinc oxide, and the like; the heavy metal oxides, hydroxides, and salts, e. g., zinc chromate, zinc oxide, zinc sulfate, lead carbonate, lead hydroxy carbonate, lead chromate, and the like; the diatomaceous earths, fuller's earth, and other commercially available particulate solids including all the rubber fillers, such as channel and furnace blacks, and the like.

While the process is generically applicable to the deposition on particulate solids of polymers of ethylenically unsaturated polymerizable monomers in amounts of from as little as 0.001% to as much as 1000% or more, based on the weight of the particulate solids, for practical purposes the desired organophilic character will generally be achieved to suitable degrees when from 1 to about 300% and especially 100% of the addition polymer, based on the particulate solids, is thereon deposited. In many instances because of the extremely low cost of the fillers and the frequently higher cost of the addition-polymerizable monomers, the amount of polymer deposited will be held at the minimum consistent with achievement of the desired organophilic character. Ordinarily, such amounts will range from 1 to about 10% polymer, based on the particulate solid.

The polymerization initiator employed in the process of this invention can be any free radical liberating, addition-polymerization initiator. Suitable types of these initiators, which are by now well recognized in the art as a class of compounds, are the peroxygen compounds, e. g., hydrogen peroxide, diethyl peroxide, diacetyl peroxide, potassium persulfate, benzoyl peroxide, and the like; and azo compounds having the acyclic azo, —N=N— group joined to discrete non-aromatic carbons at least one of which is a tertiary carbon in turn joined to carbon whose remaining valences are satisfied by oxygen or nitrogen or both (as in U. S. Patent 2,471,959), e. g., azodiisobutyronitrile, azobis(isobutyramidine hydrochloride), and the like. These azo compounds are the preferred initiators since they are free from environmental influences as to activation or deactivation such as possible acidic or redox character of some of the solids and are activatable only under easily controlled conditions of light and heat. The amount of initiator employed in this process is generally small, for example, amounts ranging from 0.001 to 5% of the weight of the polymerizable monomers can be used.

These addition-polymerization initiators can be coated on the particulate solids by any means, including deposition from the vapor phase, simple mechanical mixing in the case of the solid initiators, or solution impregnation of the particulate solids with aqueous or organic solutions of the various initiators. The present invention is not dependent upon the particular method of coating which is limited only by the nature of the particular initiator and the degree of convenience of the coating operation. Generally speaking, solution impregnation of the particulate solids will be the most convenient. After coating and before the polymerization step, the coated particulate solids should be freed of any solvent and must be carefully degassed, so that the initiator-coated particulate solids can be directly exposed to and in intimate contact with the vapors of the polymerizable monomer or monomers. When the initiator is coated on the particulate solid from the vapor phase, the degassing step will normally be carried out on the solid first, i. e., before coating with the initiator.

The process of this invention is of generic application to the addition polymerization of polymerizable compounds having the nonaromatic $>C=C<$ group, i. e., to monomeric, ethylenically unsaturated polymerizable compounds. Thus, the process of this invention is applicable, for instance, to monomeric, unsaturated, polymerizable compounds in which the unsaturation is due to a single, terminal, ethylenic group which is attached to a negative radical. More specifically it is applicable to polymerizable vinylidene compounds, including vinyl compounds, and to polymerizable acryloyl and alkacryloyl compounds. The process is also applicable to polymerizable compounds having a plurality of ethylenic linkages of aliphatic character whether conjugated or isolated. A particularly preferred class of compounds to which the process of this invention is applicable is that of polymerizable, unsaturated compounds wherein the nonaromatic carbon to carbon unsaturation comprises a terminal methylene group joined by an ethylenic double bond to its neighboring carbon, i. e., consists of a $CH_2=C<$ group.

Compounds having such a terminal group, i. e., $CH_2=C<$, which are subject to polymerization and copolymerization by the process of this invention, include those having one ethylenic unsaturation such as olefinic hydrocarbons, e. g., ethylene and styrene; acryloyl and alkacryloyl compounds, e. g., acrylic, haloacrylic, and methacrylic acids, esters, nitriles, and amides, for example, acrylonitrile, methyl methacrylate, ethyl methacrylate, butyl methacrylate, octyl methacrylate, cyclohexyl methacrylate, methoxymethyl methacrylate, n-butoxymethyl methacrylate, n-butoxyethoxyethyl methacrylate, chloroethyl methacrylate, methacrylic acid, ethyl acrylate, alpha-chloroacrylic acid, and aminoalkyl methacrylates, such as beta-diethylaminoethyl methacrylate; vinyl and vinylidene halides, e. g., vinyl chloride and vinylidene chloride; fluorinated ethylenes, e. g., vinyl fluoride, vinylidene fluoride, 1-fluoro-1-chloroethylene, tetrafluoroethylene, chlorotrifluoroethylene, trifluoroethylene and 1,1-dichloro-2,2-difluoroethylene; vinylcarboxylates, e. g., vinyl acetate, vinyl trimethylacetate, vinyl formate, vinyl hexanoate, vinyl chloroacetate and vinyl propionate; vinyl aryls, e. g., styrene and vinyl naphthalene and other vinyl derivatives such as methyl vinyl ketones, vinyl pyridines, vinyl isobutyl ethers, vinyl ethyl ethers, and the like.

The process of this invention is also generically applicable to addition polymerizable compounds containing a plurality of ethylenic double bonds, including those having conjugated ethylenic double bonds which are furthermore both terminal ethylenic double bonds such as 2-chlorobutadiene, isoprene, 2,3-dimethylbutadiene, 2-fluorobutadiene, and 2-phenoxybutadiene, and also compounds containing two or more ethylenic double bonds which are isolated with respect to each other. Compounds of this latter type include those having two or more ethylenic double bonds conjugated with a carboxylic group, e. g., methacrylic anhydride, acrylic and substituted acrylic esters of polyhydric alcohols, such as ethylene glycol dimethacrylate and diethylene glycol diacrylate. Compounds having one ethylenic group conjugated with a carboxylic group that may be employed include diallyl maleate, vinyl methacrylate and allyl methacrylate, and compounds which have no conjugation of the polymerizable ethylenic groups with carboxylic groups include diallyl phthalate, diallyl carbonate, diallyl formate, divinyl succinate and divinyl benzene.

Polymerizable compounds that have a plurality of unsaturated linkages, preferably aliphatic, either conjugated or not, may in general be polymerized by using the process of this invention. Particularly outstanding among such compounds are the -ene/-yne type monomers of which monovinyl acetylene and divinylacetylene are specific examples of the conjugated type.

While for the most part compounds which have a terminal methylene group joined by an ethylenic double bond to its neighboring carbon, i. e., compounds which have a terminal ethylene group carrying solely hydrogen on its terminal carbon, i. e., compounds containing the terminal group $CH_2=C<$, are preferred as the polymerizable and copolymerizable monomers for use in the process of this invention. Other compounds also useful in the process include the esters of fumaric and maleic acids, e. g., diethyl and dimethyl fumarate and maleate, which may be copolymerized for instance, with vinyl chloride or styrene in the process of this invention.

As is true of addition polymerizations generically, the time and temperature required vary markedly with the nature of the ethylenically unsaturated addition polymerizable monomers being used. Insofar as the particulate solids are concerned, there is essentially no practical limit whatever to the temperature range employed. The temperatures will likewise vary with the nature of the addition polymerization initiator being used. Generally speaking, the polymerization step will be carried out at temperatures ranging from $-50°$ C. for the most active addition-polymerization monomers and initiator systems to about $250°$ C. for the less active initiator systems and the less readily polymerizable monomers.

It is an essential step in the present process that the polymerization be effected between the initiator-coated particulate solid and the monomers in the vapor phase. Accordingly, the temperature of the polymerization step will likewise vary with the volatility of the particular monomers and in all instances cannot be below that temperature at which the monomer can be handled solely in the vapor phase at the particular pressure employed. Obviously therefore the temperature of the polymerization step will likewise vary with the pressure employed in the polymerization zone. These pressures can range from superatmospheric, generally no higher than 300 atmospheres for the extremely volatile monomers in the higher temperature range to as low as substantially an absolute vacuum for the less volatile monomers in the lower temperature ranges. For practical purposes the polymerization will generally be carried out at pressures ranging from about 0.1 mm. of mercury to substantially atmospheric pressure. This is especially true in the case of the more volatile monomers which for ease of convenience in handling and readier availability constitute a preferred type of monomer.

Like temperature, the time of polymerization will vary as is well known in the art with both the nature of the polymerizable monomer being used and the addition-polymerization initiator coated upon the particulate solids. In the broadest aspects of the process, the time of polymerization can vary from as short a time as a few seconds for the more volatile, more readily polymerizable monomers at the higher temperatures to as long a period as several months for the less volatile, less readily polymerizable monomers with the less active initiator systems in the lower temperature ranges. Practically speaking, the polymerization times will vary from a few minutes to generally no longer than 120 hours or so with the periods ranging between 1 and 72 hours being practically used for the preferred more volatile polymerizable monomers with the preferred initiator systems in the preferred temperature ranges.

The addition polymer-coated particulate solids, prepared by the process of this invention, are generically vastly improved in organophilic character over the corresponding unmodified particulate solids. They are likewise generically of increased compatibility with all organic media with the resultant compositions exhibiting markedly improved stability. Thus, for instance, the pigments in particulate form coated with addition polymers by the process of this invention result in much more stable and homogeneous paints, coated fabrics, films, and fibers; the latter for instance being of particularly great significance in the recently commercialized pigmented synthetic fibers.

Similarly, the particulate solid fillers, such as silica, titania, carbon black, wood flour, and the like, when coated with addition polymers by the process of this invention, are much more compatible with organic systems resulting thereby in, for instance, films and fibers of synthetic polymers possessing much greater strength and stability or, for instance, in the case of the synthetic rubbers resulting in tires and tread stocks of much greater wear resistance, lower hysteresis and increased cut growth resistance. The polymer coated fillers in the higher ranges of polymer loading, e. g. 50% or higher form tough, hard surfaced transparent shaped objects comparable in properties with like compositions of preformed polymer and unmodified filler which are opaque rather than transparent.

Finely divided metals, such as are frequently used in the present day metallized or metallichrome finishes, when coated with addition polymers by the process of this invention are similarly much more organophilic and can be compounded with much greater ease into paint vehicles and remain substantially completely homogeneously dispersed therethrough. In this particular instance, the polymer-coated metal particles are also outstanding in that the metal particles do not cause the breakdown and decomposition of the organic vehicle as so frequently happens in present day practice with the unmodified metal particles.

As many apparently widely different embodiments of this invention may be made without departing from the spirit and scope thereof, it is to be understood that this invention is not limited to the specific embodiments thereof except as defined in the appended claims.

We claim:

1. Process for preparing organophilic particulate solids which comprises passing vapors of at least one addition-polymerizable ethylenically unsaturated monomer into contact with degassed organophobic particulate solids coated with a free radical generating, addition-polymerization initiator and polymerizing the vaporized ethylenically unsaturated monomer on the surfaces of said degassed initiator-coated particulate solids, and obtaining as the resulting product organophilic particulate solids coated with the polymerized ethylenically unsaturated monomer.

2. Process for preparing organophilic particulate solids as set forth in claim 1 wherein said free radical generating, addition-polymerization initiator is an azo polymerization initiator.

3. Process for preparing organophilic particulate solids as set forth in claim 1 wherein said addition-polymerizable ethylenically unsaturated monomer is an addition-polymerizable vinyl monomer.

4. Process for preparing organophilic finely divided solid pigment material which comprises coating an organophobic finely divided solid pigment material with a free radical generating, addition-polymerization initiator, degassing the initiator-coated finely divided solid pigment material, then passing vapors of at least one addition-polymerizable ethylenically unsaturated monomer into contact with said degassed initiator-coated finely divided solid pigment material and polymerizing the vaporized ethylenically unsaturated monomer on the surfaces of said initiator-coated finely divided solid pigment material, and obtaining as the resulting product organophilic finely divided solid pigment material coated with the polymerized ethylenically unsaturated monomer.

5. Process for preparing organophilic finely divided titanium dioxide which comprises: coating finely divided titanium dioxide with a free radical generating, addition-polymerization initiator; degassing the initiator-coated, finely divided titanium dioxide; then passing vapors of at least one addition-polymerizable, ethylenically unsaturated monomer into contact with said degassed, initiator-coated, finely divided titanium dioxide; polymerizing the vaporized, ethylenically unsaturated monomer on the surfaces of said initiator-coated, finely divided titanium dioxide; and obtaining as the resulting product organophilic, finely divided titanium dioxide coated with the polymerized, ethylenically unsaturated monomer.

6. Process for preparing organophilic finely divided solid filler material which comprises coating organophobic finely divided solid filler material with a free radical generating, addition-polymerization initiator, degassing the initiator-coated finely divided solid filler material, then passing vapors of at least one addition-polymerizable ethylenically unsaturated monomer into contact with said degassed initiator-coated finely divided solid filler material and polymerizing the vaporized ethylenically unsaturated monomer on the surfaces of said initiator-coated finely divided solid filler material, and obtaining as the resulting product organophilic finely divided solid filler material coated with the polymerized ethylenically unsaturated monomer.

7. Process for preparing organophilic finely divided silica which comprises coating organophobic finely divided silica with a free radical generating, addition-polymerization initiator, degassing the initiator-coated finely divided silica, then passing vapors of a least one addition-polymerizable ethylenically unsaturated monomer into contact with said degassed initiator-coated finely divided silica and polymerizing the vaporized ethylenically unsaturated monomer on the surfaces of said initiator-coated finely divided silica, and obtaining as the resulting product organophilic finely divided silica coated with the polymerized ethylenically unsaturated monomer.

8. Process for preparing organophilic finely divided metal particles which comprises coating finely divided metal particles with a free radical generating, addition-polymerization initiator, degassing the initiator-coated finely divided metal particles, then passing vapors of at least one addition-polymerizable ethylenically unsaturated monomer into contact with said degassed initiator-coated finely divided metal particles and polymerizing the vaporized ethylenically unsaturated monomer on the surfaces of said initiator-coated finely divided metal particles, and obtaining as the resulting product organophilic finely divided metal particles coated with the polymerized ethylenically unsaturated monomer.

9. Process for preparing organophilic finely divided metal particles as set forth in claim 8 wherein said finely divided metal particles are finely divided aluminum.

10. Process for preparing organophilic finely divided silica which comprises coating arganophobic finely divided silica with a free radical generating, addition-polymerization initiator, degassing the initiator-coated finely divided silica, then passing vapors of methyl methacrylate into contact with said degassed initiator-coated finely divided silica and polymerizing the vaporized methyl methacrylate on the surfaces of said initiator-coated finely divided silica, and obtaining as the resulting product organophilic polymethyl methacrylate-coated finely divided silica.

11. Process for preparing organophilic finely divided silica as set forth in claim 10 wherein said free radical generating, addition-polymerization initiator is an azo polymerization initiator.

12. Process for preparing organophilic finely divided titanium dioxide which comprises coating finely divided titanium dioxide with a free radical generating, addition-polymerization initiator, degassing the initiator-coated finely divided titanium dioxide, then passing vapors of styrene into contact with said degassed initiator-coated finely divided titanium dioxide and polymerizing the vaporized styrene on the surfaces of said initiator-coated finely divided titanium dioxide, and obtaining as the resulting product organophilic polystryrene-coated finely divided titanium dioxide.

13. Process for preparing organophilic finely divided titanium dioxide as set forth in claim 12 wherein said free radical generating, addition-polymerization initiator is an azo polymerization initiator.

14. Process for preparing organophilic finely divided aluminum which comprises coating finely divided aluminum with a free radical generating, addition-polymerization initiator, degassing the initiator-coated finely divided aluminum, then passing vapors of methyl methacrylate into contact with said degassed initiator-coated finely divided aluminum and polymerizing the vaporized methyl methacrylate on the surfaces of said initiator-coated finely divided aluminum, and obtaining as the resulting product organophilic polymethyl methacrylate-coated finely divided aluminum.

15. Process for preparing organophilic finely divided aluminum as set forth in claim 14 wherein said free radical generating, addition-polymerization initiator is an azo polymerization initiator.

16. Process for preparing organophilic finely divided titanium dioxide which comprises coating finely divided titanium dioxide with a free radical generating, addition-polymerization initiator, degassing the initiator-coated finely divided titanium dioxide, then passing vapors of acrylonitrile into contact with said degassed initiator-coated finely divided titanium dioxide and polymerizing the vaporized acrylonitrile on the surfaces of said initiator-coated finely divided titanium dioxide, and obtaining as the resulting product organophilic polyacrylonitrile-coated finely divided titanium dioxide.

17. Process for preparing organophilic finely divided titanium dioxide as set forth in claim 16 wherein said free radical generating, addition-polymerization initiator is an azo polymerization initiator.

18. Process for preparing organophilic finely divided titanium dioxide which comprises coating finely divided titanium dioxide with a free radical generating, addition-polymerization initiator, degassing the initiator-coated finely divided titanium dioxide, then passing vapors of styrene and divinylbenzene into contact with said degassed initiator-coated finely divided titanium dioxide and polymerizing the vaporized styrene and divinylbenzene on the surfaces of said initiator-coated finely divided titanium dioxide, and obtaining as the resulting product organophilic styrene/divinylbenzene copolymer-coated finely divided titanium dioxide.

19. Process for preparing organophilic finely divided titanium dioxide as set forth in claim 18 wherein said free radical generating, addition-polymerization initiator is an azo polymerization initiator.

20. Process for preparing organophilic particulate solids which comprises coating organophobic particulate solids with a free radical generating, addition-polymerization initiator, degassing said particulate solids, then passing vapors of at least one addition-polymerizable ethylenically unsaturated monomer into contact with said degassed, initiator-coated particulate solids, and polymerizing the vaporized ethylenically unsaturated monomer on the surfaces of said initiator-coated particulate solids and obtaining as the resulting product organophilic particulate solids coated with the polymerized ethylenically unsaturated monomer.

21. Process for preparing organophilic particulate solids as set forth in claim 20 wherein said organophobic particulate solids are coated with said free radical generating, addition-polymerization initiator and then said initiator-coated particulate solids are degassed.

22. Process for preparing organophilic particulate solids as set forth in claim 20 wherein said organophobic particulate solids are degassed and then said degassed particulate solids are coated with said free radical generating, addition-polymerization initiator.

References Cited in the file of this patent

UNITED STATES PATENTS

| Number | Name | Date |
|---|---|---|
| 2,562,182 | Godley | July 31, 1951 |
| 2,589,705 | Kistler | Mar. 18, 1952 |
| 2,657,149 | Iler | Oct. 27, 1953 |
| 2,662,034 | Mason et al. | Dec. 8, 1953 |
| 2,728,732 | Arnett | Dec. 27, 1955 |
| 2,728,740 | Iler | Dec. 27, 1955 |
| 2,749,248 | Benson | June 5, 1956 |

OTHER REFERENCES

Ellis: The chemistry of Synthetic Resins, Reinhold Publishing Corp., 1935, volume 1, page 240.